United States Patent [19]
Luhdorff et al.

[11] 3,937,525
[45] Feb. 10, 1976

[54] CONTROL SYSTEM PROVIDING A VARIABLE IMPULSE-LIKE BRAKE RELEASE AND/OR REAPPLICATION SIGNAL FOR WHEEL SLIP CONTROL

[75] Inventors: Dieter Luhdorff; Bernd Oehlerking, both of Hannover; Hugo Jaworsky, Altencelle; Gerhard Koth, Westercelle; Klaus-P. Simon, Hannover, all of Germany

[73] Assignee: WABCO Westinghouse GmbH, Hannover, Germany

[22] Filed: Feb. 25, 1974

[21] Appl. No.: 445,234

[52] U.S. Cl. ............... 303/21 P; 235/150.2; 303/20
[51] Int. Cl.² ............................................. B60T 8/08
[58] Field of Search................ 188/181; 235/150.2; 303/20, 21; 317/5; 324/161–162; 340/53, 62

[56] References Cited
UNITED STATES PATENTS

| | | | |
|---|---|---|---|
| 3,245,213 | 4/1966 | Thompson et al. | 303/21 EB |
| 3,499,689 | 3/1970 | Carp et al. | 303/20 X |
| 3,586,385 | 6/1971 | Florus et al. | 303/20 X |
| 3,637,264 | 1/1972 | Leiber et al. | 303/21 BE |
| 3,698,772 | 10/1972 | Nixon | 303/21 BE |
| 3,704,043 | 11/1972 | Hickner et al. | 303/21 BE |
| 3,744,854 | 7/1973 | Doya et al. | 303/21 P |
| 3,806,205 | 4/1974 | Hipa et al. | 303/21 CG X |

*Primary Examiner*—Trygve M. Blix
*Assistant Examiner*—Stephen G. Kunin
*Attorney, Agent, or Firm*—R. W. McIntire, Jr.

[57] ABSTRACT

An anti-wheel skid brake control system including a control circuit for providing an impulse-like control current in accordance with which electro-magnetic control valves are operated to either release or reapply brake pressure in an intermittent fashion. The impulse-like control current displays a predetermined pulse form that may vary in duration and interval with different stages of a digital counter whose output is continuously monitored by a decoding logic network. The variable, impulse-like control current provides for a gradual change in the brake pressure during the final stage of brake release or reapplication during a wheel skid to accordingly avoid overshooting of the brake release or reapplication pressure.

3 Claims, 1 Drawing Figure

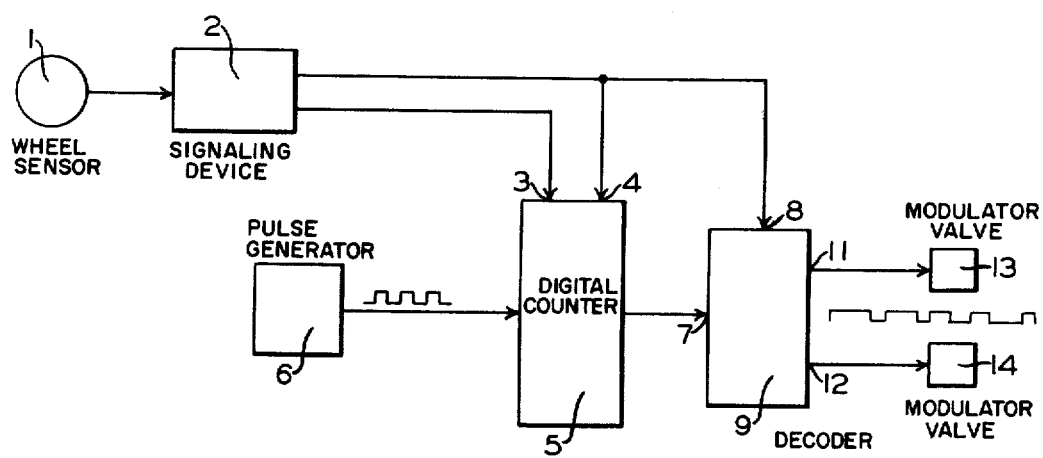

3,937,525

CONTROL SYSTEM PROVIDING A VARIABLE IMPULSE-LIKE BRAKE RELEASE AND/OR REAPPLICATION SIGNAL FOR WHEEL SLIP CONTROL

BACKGROUND OF THE INVENTION

The present invention relates to an anti-wheel skid brake control system of the type wherein an electronic controlling device subject to signals representative of the behavior of a particular wheel of a railway vehicle or automotive type truck, for example, provides control of electro-magnetic modulating valves via which braking pressure is regulated to control a wheel skid. The modulating valves, under the influence of the electronic controlling device, apply and release brake pressure in a cyclical fashion during the period a vehicle is operating in a low adhesion environment in an attempt to maintain vehicle retardation as close as possible to the skid point. It is well known, however, that in releasing brake pressure in response to a skidding wheel, the rate of release at a point where the wheel skid is substantially corrected may be so great as to overshoot the actual pressure capable of bringing the wheel skid under control. The resulting excess pressure reduction, of course, causes an unnecessary loss of brake effort during the interim until a subsequent reapplication of brake pressure is initiated. Likewise, the rate of reapplication of brake pressure following correction of the wheel skid may be so great at the time brake effort is restored to a level just short of the adhesion limit sufficient to cause wheel skid that the reapplication pressure will overshoot the adhesion limit and cause another wheel skid. This will result in excessive cycling of the brake pressure with the result of reduced brake efficiency.

SUMMARY OF THE INVENTION

It is accordingly the object of the present invention to provide an improved anti-wheel skid brake control system of the above described type which will regulate brake pressure during the final stage of brake release and reapplication in order to reduce the rate of change of braking pressure and accordingly achieve a brake pressure curve adaptable to the given vehicle brake system, type of vehicle, etc.

It is a further object of this invention to modify the brake pressure curve to obtain a stepped portion in which the modulating valves, during either a brake application or release, are intermittently pulsed to a lap condition in which no change in the brake pressure occurs.

Still another object of the invention is to effect such intermittent operation of the modulating valves by generating an impulse-like waveform whose successive pulses and/or pulse intervals are of different duration.

In accordance with the present invention, there is provided an electronic control device including a pulse generator that emits a constant pulse frequency to a digital counter subject to application and release signals obtained from a signaling device. A decoding logic network is subject to one of the application and release signals for selecting the appropriate one of an application and release modulator valve connected to the output of the logic network, which network is conditioned in accordance with the outputs provided by the counter to vary the duration and/or interval of the impulse signal supplied by the decoding network to the selected application or release modulator valve. This is accomplished by the logic of the decoding network which constantly interrogates and decodes the counter status during a wheel skid condition so as to reduce the rate of brake pressure release and subsequent reapplication, especially near the end of the period such brake pressure modulation is occurring.

Other objects and advantages of the present invention will become apparent from the following more detailed description when considered with the accompanying single FIGURE drawing showing a block diagram of the anti-wheel skid system according to the invention.

Associated with a vehicle wheel to be monitored for wheel skid is a sensor unit 1 which scans the wheel to monitor the wheel speed in a well known manner. For example, sensor unit 1 may comprise a tach-generator device which monitors the wheel speed by use of a wheel driven gear tooth passing through a magnetic field to cause generation of an a.c. voltage frequency is proportional to the rotational velocity of the gear tooth and thus the speed of the wheel. The resulting wheel speed signal in the form of an a.c. frequency is passed to a conventional signaling device 2, which generates brake release and reapplication signals according to the rate of change of the speed signal.

While different forms of signal device 2 may be employed, one well known form is that of a differentiator whose parameters may be selected so that the brake release signal is produced when the wheel being monitored exceeds a predetermined rate of deceleration. It will be understood, of course, that the frequency signal produced by sensor unit 1 representative of wheel speed must be first converted into a d.c. voltage suitable for use by the differentiator, the magnitude of which voltage is proportional to the frequency signal.

By way of an example of a differentiator and frequency to voltage converter suitable for use as signaling device 2, reference may be had to U.S. Pat. No. 3,482,887 granted Dec. 9, 1969, and assigned to the assignee of the present invention. A review of this patent will show that the circuits represented by blocks 9, 13 and 17 are recognized in the art as conventional and should therefore require no further explanation. Signaling device 2 is therefore shown in block form for the sake of clarity.

The brake release signal emitted by signaling device 2 when wheel 1 exceeds a predetermined rate of deceleration is connected to an input control port 3 of a conventional digital counter 5, which is supplied with a constant frequency impulse signal from a conventional pulse generator 6. The brake reapplication signal from signaling device 2 is connected to a control input 4 of counter 5 and occurs in the absence of the brake release signal. Therefore, the brake reapplication signal may be simply obtained by means of an inverter gate to which the brake release signal is connected so that the brake reapplication signal at input 4 is present only when the brake release signal is absent. The output stages of the digital counter, which may be several in number, each reflect a logic "1" or logic "0" output condition to form a binary code representative of the number of input pulses received by counter 5. These code signals are connected to the inputs 7 of a decoder 9 having a control input 8 to which the brake reapplication signal generated at the output of signaling device 2 is connected. Decoder 9 comprises logic circuitry programmed to produce an impulse-like control current at either of its outputs 11 or 12. The decoder output 11 or 12 having the impulse-like control current is selected according to the logical condition of the reapplication signal present at input 8. The magnitude of this pulsed or stepped control current waveform alternates between preselected maximum and minimum values, the duration of which alternations varies as the counter code signal at input 7 of the decoder passes through different count ranges, as more fully explained hereinafter with reference to the table on page 5. An output 11 of decoder 9 is connected to the solenoid of an electro-magnetic modulator valve 13, while the other output 12 of decoder 9 is similarly connected to a modulator valve 14. These modulator valves 13 and 14 are energized by a stepped or pulsed control current transmitted via outputs 11 and 12 to provide for the release and reapplication of brake pressure in the event of a wheel skid.

When a brake pressure release or reapplication signal is present during a wheel skid cycle, the digital counter 5 is activated to continuously indicate the number of pulses emitted by pulse generator 6 in the form of the binary code signals that are then fed to decoder 9, where they are decoded in order to obtain an indication of the different stages of advancement of the counter and thereby obtain different duration pulses and pulse intervals forming the stepped or pulsed control current depending upon the number of input pulses registered.

The presence or absence of a signal at control input 8 of decoder 9 establishes which one of the outputs 11 or 12 provides control of the respective modulator valves 13 or 14 in accordance with the pulsed or stepped control current generated. If a signal is present at control input 4, then this logical "1" signal also acts via the control input 8 of decoder 9 to set up the logic thereof so that pulsed or stepped control current generated by decoder 9 appears at output 11, for example. When a signal is present at control input 3 of counter 5, however, it can be assumed that the signal at input 4 is absent, so that the signal appearing at control input 8 of decoder is in the form of a logical "0", 9, with the result that the pulsed or stepped control current appears at output 12. Thus, both modulator valves are controlled in a pulsed or stepped fashion during a wheel skid control cycle responsive to a brake release or reapplication signal to vary the rate of brake pressure release or reapplication.

It is to be understood that the different pulse counts determining the length of a pulse and pulse interval may be selected to include any desired number of pulses emitted by the pulse generator so that a different pulse count for successive pulses and pulse intervals is possible to vary the pulsed or stepped waveform of the control current to the modulator valves, accordingly.

For the purpose of further illustration, the following table shows an example of different ranges of pulse signals from pulse generator 6 and the corresponding pulse or pulse interval of the controlling current, which vary in duration depending upon the number of pulses in the respective range of pulses monitored by decoder 9. In the control current column of the table, the numeral "1" indicates the presence of a pulse and the numeral "0" indicates the absence of a pulse or a pulse interval.

| Impulse Signals | Controlling Current |
| --- | --- |
| 1–15 | 1 |
| 16–20 | 0 |
| 21–33 | 1 |
| 34–39 | 0 |
| 40–48 | 1 |

The initial pulse of the control current waveform to be generated occurs by reason of decoder 9 emitting a current signal for a duration corresponding to the time required for counter 5 to receive 15 impulses of pulse generator 6. For a consecutive period determined by the time required to count the following 4 impulses of pulse generator 6, that is pulses 16–20, the logic of decoder 9 causes the control current to be interrupted so that a pulse interval exists. Between the next impulses 21–33 corresponding to 12 impulses of pulse generator 6, decoder 9 again generates a current signal. During the time between the next impulses 34–39 corresponding to 5 impulses of pulse generator 6, the control current is again terminated and subsequently restored during the following impulses 40–48 corresponding to 8 impulses of pulse generator 6.

From the foregoing example, it will be seen that a succession of pulses and pulse intervals of control current, each of a different time duration, is formed to provide the stepped or pulsed control current waveform, in response to which energization of the modulator valves 13 or 14 is controlled. More specifically, the stepped or pulsed control current waveform consists of successive pulses of decreasing time duration and pulse intervals of increasing time duration so as to be characterized by a variable waveform period, as represented by the waveform shown in the drawing at the output of decoder 9. In response to this control current waveform, the appropriate modulator valve 13 or 14 is intermittently operated for progressively shorter durations, while the delay between intermittent operation is progressively increased. For example, if excessive wheel deceleration is monitored by sensor 1 and detected by signaling device 2 in accordance with the foregoing explanation, a brake release signal is emitted by signaling device 2 and supplied to input 3 of counter 5 in the form of a logical "1". Since the reacceleration signal is the inverse of the brake release signal, input 4 of counter 5 and input 8 of counter 9 see a logical "0" signal. The decoder 9 includes circuitry connected to output 11 which is enabled to emit the impulse-like control current to modulator valve 13 to effect a release of brake pressure, such release occurring at a progressively decreased rate in accordance with the invention, as previously explained.

With the reduction of brake pressure at the excessively decelerating wheel accomplished, the wheel can be expected to resume normal rotation by spinning up to synchronous speed. As this occurs, the brake release signal emitted by signaling device 2 disappears, while concurrently the reapplication signal arises in the form of a logical "1".

The decoder circuitry connected to output 12 is enabled, in this case, to emit the impulse-like control current to modulator valve 14 to effect a restoration of brake pressure, which again occurs at a progressively decreased rate in accordance with the invention.

It should be obvious to those skilled in the art that decoder 9 may be arrranged with simple AND gate logic and inverter gates to enable the impulse-like control current to be supplied to the appropriate modulator valve, as determined by the logical condition prevailing at input 8 of decoder 9. It will therefore be apparent that the result of this control current waveform of unique character is a decreased rate of brake pressure modulation as the brake pressure approaches the point at which the wheel deceleration or acceleration is brought under control, thereby avoiding excessive brake pressure modulation accompanied by overshooting the proper pressure and consequent instability of the control system.

By providing a pulse generator capable of producing different pulse frequencies, a preselected pulse shape for a given value range of pulses may be stretched out or compressed.

Having now described the invention what we claim as new and desire to secure by letters patent is:

1. An anti-wheel skid brake control system for a vehicle comprising:
   a signaling means for evaluating the dynamic behavior of a wheel of said vehicle and providing brake pressure release and reapplication signals when certain chosen conditions of wheel rotation have been detected;
   b valve means for controlling modulation of fluid brake pressure; and
   c control circuit means for providing an impulselike control signal to effect intermittent operation of said valve means in response to either one of said release and reapplication signals being provided, said control circuit means comprising:
      i a pulse generator for emitting a predetermined impulse frequency;
      ii a digital counter driven in accordance with the impulse frequency of said pulse generator; and
      iii decoding means for interrogating the output of said digital counter and emitting said impulselike control signal so as to vary the duration of respective pulses of said control signal according to different pulse ranges of said impulse frequency, said control signal being characterized by a waveform displaying a predetermined irregular pulse pattern.

2. The system as recited in claim 1, further characterized in that the intervals between pulses of said control signal vary according to different pulse ranges of said impulse frequency.

3. The system as recited in claim 2, further characterized in that successive pulses of said control signal decrease in duration and said pulse intervals increase in duration as said output of said counter increases to thereby decrease the intermittent operation of said valve means so long as either one of said release and reapplication signals is present.

* * * * *